Jan. 5, 1965     H. SCHULZE     3,164,075
AUTOMATIC BATTERY TEST AND CONTROL CIRCUIT
FOR PHOTOGRAPHIC CAMERAS
Filed Oct. 27, 1961     2 Sheets-Sheet 1

*Inventor*
HEINZ SCHULZE

By *Irvin S. Thompson*
                         *Attorney*

United States Patent Office 3,164,075
Patented Jan. 5, 1965

3,164,075
AUTOMATIC BATTERY TEST AND CONTROL CIRCUIT FOR PHOTOGRAPHIC CAMERAS
Heinz Schulze, Dresden, Germany, assignor to VEB Kamera- und Kinowerke Dresden, Dresden, Germany
Filed Oct. 27, 1961, Ser. No. 148,147
3 Claims. (Cl. 95—10)

The invention relates to photographic cameras having electric devices fed by a battery.

In order to ensure the operational reliability of such cameras it is necessary from time to time to test the voltage of the battery. For this purpose galvanometers have already been installed in the camera, which expediently at the same time are used as galvanometer for a photoelectric exposure-measuring device. In every case however the checking requires additional attention on the part of the photographer, in that the deflection of the galvanometer pointer must be compared with reference to a check mark. If this checking is neglected there is danger of incorrect exposures.

The object of the invention is the avoidance of this disadvantage by the provision of a camera having an automatically operating device for the testing of the voltage of the battery.

In accordance with the invention this is achieved due to the fact that a test resistance and a galvanometer are connectible through a release switch to the battery and the pointer of the galvanometer together with a control contact which can be reached by the pointer in the case of adequate battery voltage lies in the current circuit of the battery-fed electric device. In the case of a photoelectric exposure-measuring device installed in the camera the galvanometer in any case provided for this can be used at the same time expediently for the testing of the battery voltage. Here the test resistance together with the galvanometer of the photo-electric exposure-measuring device is connectible by means of the release switch to the battery, while the control contact which can be reached by the pointer of the galvanometer in the case of adequate battery voltage is connected to a self-holding relay which switches off the test resistance, but on the other hand connects the photo-electric cell to the galvanometer and all the electric devices to the battery. For the purpose of possible manual setting of the exposure factor controlled by the galvanometer a selector switch can be provided which alternately closes the photo-electric cell and, through tappings, a fixed resistance connected to an exposure-independent battery, to the galvanometer. The fixed resistance at the same time is preferably connected as test resistance. The details of the invention may be seen from illustrated and described examples of embodiment.

Figure 1:
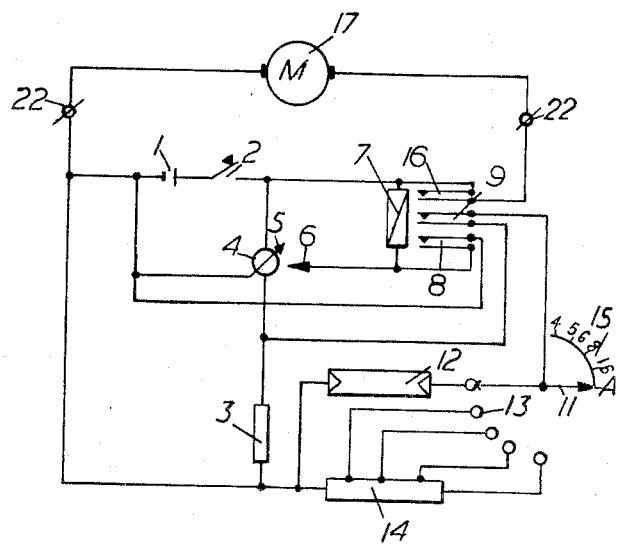
Figure 3:
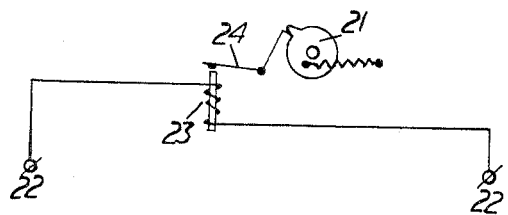
Figure 2:
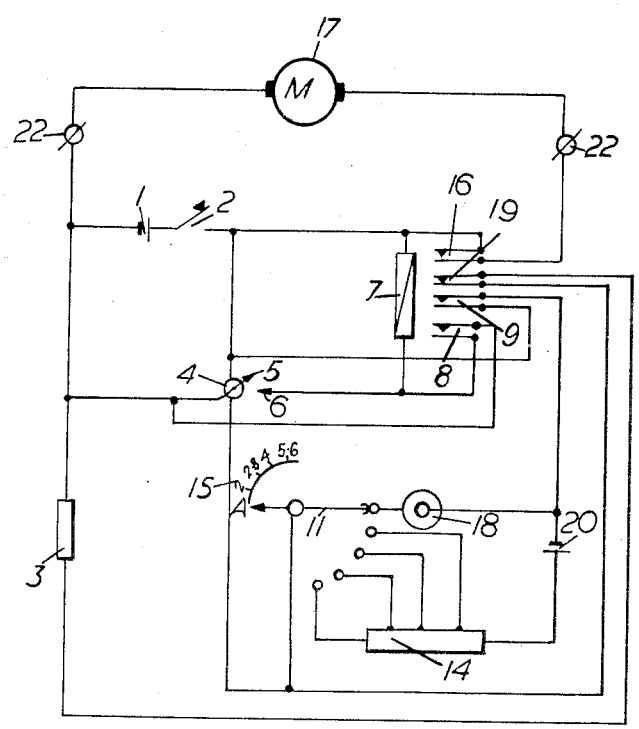

FIGURE 1 shows a circuit arrangement in connection with a photo-electric exposure-measuring device with photo-electric resistance, FIGURE 2 shows a circuit arrangement in combination with a photo-electric exposure-measuring device with photo-electric cell and FIGURE 3 shows the connection of a spring-driven camera mechanism.

The circuit shown in FIGURE 1 comprises a battery 1, a switch 2, a moving coil galvanometer 4, and a resistor 3 all connected in series. The pointer 5 connected to the moving coil of the galvanometer 4 carries an electric contact which cooperates with a fixed electric contact 6. A lead connects the positive side of the battery 1 with the contact on the pointer 5 and a further lead connects the contact 6 with one side of the coil 7 of a relay, the other side of said coil being connected to the connection between the switch 2 and the moving coil of the galvanometer 4.

The relay is provided with three pairs of contacts 8, 9 and 16 which are all open when the relay is in the deenergised condition. The contacts of pair 8 serve as a hold-on device for the relay and are connected respectively to the positive side of the battery and to the connection between contact 6 and coil 7. The contacts of pair 16 are connected respectively to the connection between the switch 2 and the moving coil of the galvanometer 4 and to the terminal 22 of the camera drive motor 17. The other terminal 22 of the motor 17 is connected to the positive side of the battery 1.

The contacts of the pair 9 are connected respectively to the slider of a selector switch and to the connection between the moving coil of the galvanometer 4 and the resistor 3. A photo-emissive cell 12 is connected between the positive side of the battery 1 and the end contact of the selector switch 11. The remaining contacts of the selector switch are connected respectively to tappings 13 or a resistor 14 which is also connected to the positive side of the battery 1. The selector switch is provided with a pointer arranged to move over a scale 15 which comprises the letter "A", indicating automatic control, and a range of diaphragm aperture values 4, 5.6, 8 and 16.

The operation of the circuit shown in FIGURE 1 is as follows:

The operator may set the camera for automatic control i.e. in the case where the aperture diaphragm is automatically set according to the prevailing light intensity, by turning the selector switch 11 so that its pointer is adjacent "A" on the scale 15 or he may set the desired aperture ratio which thereby connects into the galvanometer circuit the appropriate resistor tapping.

The galvanometer is adapted to move the camera aperture diaphragm and the structure for effecting the connection between the galvanometer and the diaphragm is not shown. Such structure may be any one of many known arrangements common in the camera art.

When the switch 2 is closed a circuit is completed through the moving coil of the galvanometer 4 and the resistor 3. The current flowing through the moving coil causes a deflection of the latter. If this deflection is not sufficient to bring the contact on the pointer 5 into contact with contact 6 due to the failing power of the battery 1 then no further operation of the circuit takes place since the coil 7 of the relay is not energised and accordingly the operator will know that the battery is weak because the camera fails to operate.

If the battery is of sufficient strength to provide a current, which is determined by appropriate selection of the resistor 3, capable of bringing the contact on the pointer 5 in contact with the contact 6, then on closing the switch 2 the circuit through the coil 7 of the relay will be completed and the coil energised whereby the contact pairs 8, 9 and 16 will close, the latter closing the circuit through the motor 17.

The closing of contact pair 9 brings into the circuit comprising the battery 1, switch 2, moving coil of the galvanometer 4 and the resistor 3, either the photo-emissive cell 12 or one of the tappings of the resistor 14 (according to whether automatic setting or one particular aperture diaphragm setting has been selected) parallel with the resistor 3. As soon as the cell 12 or the resistor 14 is connected in parallel with the resistor 3 the contact on the pointer 5 leaves contact 6 since the current through the galvanometer will be reduced. However, by reason of the closing of the contact pair 8 the relay holds and the camera will remain in operation whilst the switch 2 is being held closed by the operator.

In FIGURE 2 a further circuit is shown whereby the camera fails to function if the battery is too weak. This further circuit comprises a battery 1, a switch 2, a moving coil galvanometer 4, and a resistor 3 all connected in series. The point 5 connected to the moving coil of the galvanometer 4 carries an electric contact which cooperates with a fixed electric contact 6. A lead connects the positive side of the battery 1 with the contact on the pointer 5 and a further lead connects the contact 6 with one side of the coil 7 of a relay, the other side of said coil being connected to the connection between the switch 2 and the moving coil of the galvanometer 4.

The relay is provided with four pairs of contacts 8, 9, 16 and 19 of which contact pairs 8, 9 and 16 are open and contact pair 19 closed when the relay is in the de-energised condition. The contacts of pair 8 serve as a hold-on device for the relay and are connected respectively to the positive side of the battery and to the connection between contact 6 and coil 7. The contacts of pair 16 are connected respectively to the connection between the switch 2 and the moving coil of the galvanometer 4 and to the terminal 22 of the camera drive motor 17. The other terminal 22 of the drive motor 17 is connected to the positive side of the battery 1.

The contacts of the pair 9 are connected respectively to the connection between the switch 2 and the moving coil and to the connection between one side of a photo-voltaic cell 18 and the positive side of a further battery 20. The negative side of the battery 20 is connected to a resistor 14 which has a number of tappings connected respectively to contacts of a selector switch 11. The end contact of the switch 11 is connected to the other side of the cell 18 and the slider of switch 11 is connected to the connection between the resistor 3 and the moving coil.

The selector switch is provided with a pointer arranged to move over a scale 15 which comprises the letter "A" and a range of diaphragm aperture values as in the first example.

The contacts of pair 19 are arranged in the connection between the resistor 3 and the moving coil.

The operation of the circuit of FIGURE 2 is as follows:

The selector switch is set as required as described above. When the switch 2 is closed a circuit is completed through the moving coil of the galvanometer 4 and the resistor 3. The current flowing through the moving coil causes a deflection of the latter. If the deflection is not sufficient to bring the contact on the pointer 5 into contact with the contact 6 then the relay is not energised and the camera will fail to operate.

However, if the relay is energised contact pairs 8, 9 and 16 will close, the latter pair closing the circuit through the motor 17, and the contact pair 19 will open, breaking the connection between the resistor 3 and the galvanometer 4.

The closing of the contact pair 9 effects the connection across the galvanometer 4 of either the cell 18 or one of the tappings and the battery 20 (according to selection). As soon as the cell 18 or the tapping and battery is connected across the galvanometer the contact on the pointer 5 leaves the contact 6 since the current through the moving coil will be reduced. The relay will hold on since the current through the coil 7 is maintained through the contact pair 8 and the camera will continue to operate whilst the switch 2 is being held closed.

According to FIGURE 3 in place of an electric motor drive for the camera mechanism a spring mechanism 21 can be used, in this case an electro-magnet 23 is connected to the terminals 22 and releases the spring mechanism 21 through a pawl 24.

I claim:

1. In a photographic camera having an electric device drivable by a battery, a moving coil galvanometer connectible to said battery, and means for effecting a change of current through said galvanometer whereby the latter receives a current proportional to the relevant exposure factor, the provision of a relay device operable by the galvanometer at a predetermined deflected position of the moving coil thereof, said relay device having contacts which close on operation of the relay to complete the circuit to said electric device and bring into operation said means for effecting a change of current through said galvanometer.

2. In a photographic camera having a moving coil galvanometer connectible to a battery and an electric device drivable by a battery, the provision of a first circuit comprising a first switch, a first resistor and said galvanometer whose moving coil deflects to a predetermined operating position in the case of adequate battery charge when said first circuit is completed by actuation of said first switch, a second circuit comprising a self-holding relay device having an operating winding, the battery and a second switch operable by said moving coil when the latter reaches said predetermined operating position, said second circuit being completed on actuation of said second switch, said relay device having a first set of contacts to connect the battery to said electric device on operation of said relay device, and a third circuit comprising a second set of contacts of said relay device, a photo-electric cell, a second resistor, said galvanometer and selecting means for alternately operatively connecting said photo-electric cell and said resistor in said third circuit for effecting change of current through said galvanometer whereby the latter receives a current proportional to the relevant exposure factor, said third circuit being effective on the operation of said relay device.

3. In a photographic camera having a moving coil galvanometer connectible to a battery and an electric device drivable by said battery, the provision of a first circuit comprising a first switch, a first resistor and said galvanometer whose moving coil deflects to a predetermined operating position in the case of adequate battery charge when said first circuit is completed by actuation of said first switch, a second circuit comprising a self-holding relay device having an operating winding, the battery and a second switch operable by said moving coil when the latter reaches said predetermined operating position, said second circuit being completed on actuation of said second switch, said relay device having a first set of contacts in said first circuit and arranged so as to break on operation of said relay device and a second set of contacts to connect the battery to the electric device on operation of said relay device, and a third circuit comprising a third set of contacts of said relay device, which third set of contacts close on operation of said relay device, a photo-electric cell, a resistor connectible to a further battery, said galvanometer, and selecting means for alternately operatively connecting said photo-cell and said resistor together with said further battery in said third circuit for effecting change of current through said galvanometer whereby the latter receives a current proportional to the relevant exposure factor, said third circuit being effective on the operation of said relay device.

References Cited by the Examiner

UNITED STATES PATENTS

| | | | |
|---|---|---|---|
| 2,387,466 | 10/45 | Rath | 95—10 |
| 2,755,704 | 7/56 | Gilbert | 95—10 |
| 2,935,921 | 5/60 | Rentschler | 95—10 |
| 2,973,699 | 3/61 | Nerwin | 95—10 |
| 3,077,153 | 2/63 | Gopfert | 95—10X |

NORTON ANSHER, *Primary Examiner.*
DELBERT B. LOWE, EMIL G. ANDERSON,
*Examiners.*